CARL A. MENKENS
RUSSELL C. STEVENSON
INVENTOR.

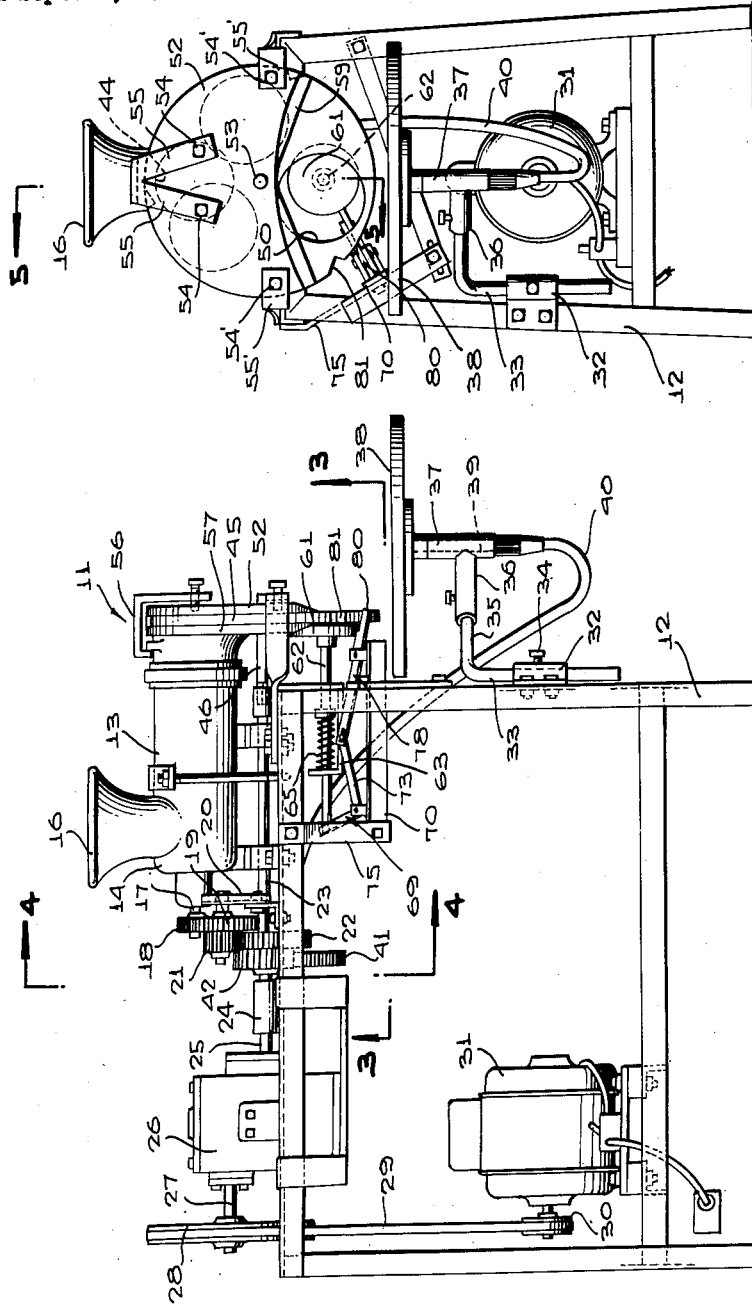

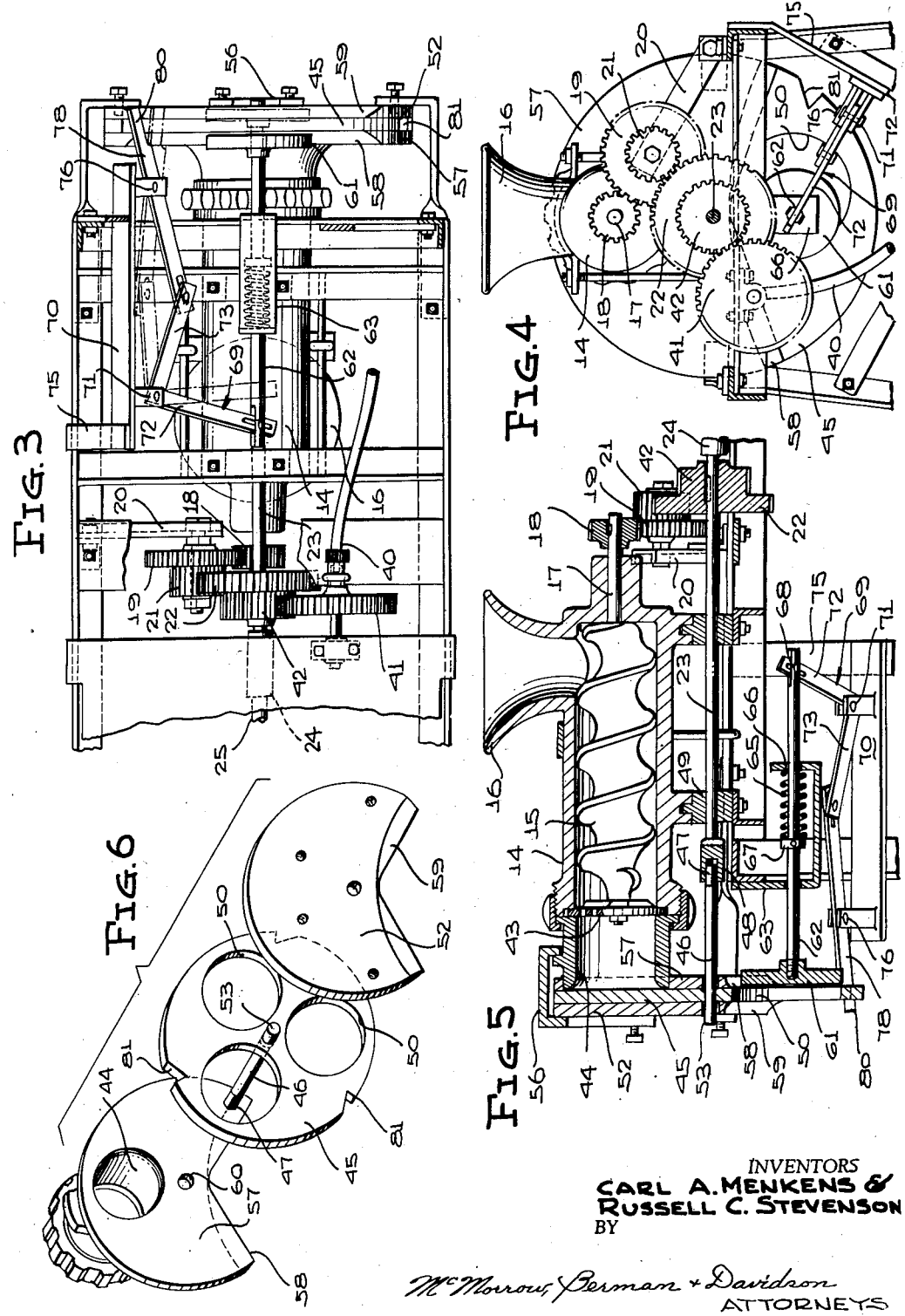

BY
McMorrow, Berman & Davidson
ATTORNEYS

United States Patent Office 2,793,394
Patented May 28, 1957

2,793,394

MEAT PATTY FORMING MACHINE

Carl A. Menkens, Winchester, and Russell C. Stevenson, Sutherlin, Oreg.

Application September 8, 1954, Serial No. 454,792

5 Claims. (Cl. 17—32)

This invention relates to meat grinders, and more particularly to an improved combination meat grinder and pattie forming machine.

A main object of the invention is to provide an improved power driven meat grinder provided with means for automatically forming a meat pattie and discharging said pattie on a table associated with the meat grinder.

A further object of the invention is to provide a novel and improved combination meat grinder and pattie forming machine which is simple in construction, which is reliable in operation, which produces meat patties of substantial firmness and of uniform shape, and which produces the meat patties rapidly and economically.

A still further object of the invention is to provide an improved power driven combination meat grinder and pattie forming machine which involves relatively inexpensive components, which is rugged in construction, and which is arranged to deliver meat patties in rapid sequence without requiring the patties to be manually handled.

Further objects and advantages of the invention will become apparent from the following description and claims, and from the accompanying drawings, wherein:

Figure 1 is a side elevational view of an improved combination meat grinder and pattie forming machine constructed in accordance with the present invention.

Figure 2 is an end elevational view of the machine of Figure 1.

Figure 3 is an enlarged sectional view taken on the line 3—3 of Figure 1.

Figure 4 is an enlarged sectional view taken on the line 4—4 of Figure 1.

Figure 5 is an enlarged sectional view taken on the line 5—5 of Figure 2.

Figure 6 is an enlarged exploded view of the elements constituting the pattie forming assembly.

Figure 7:
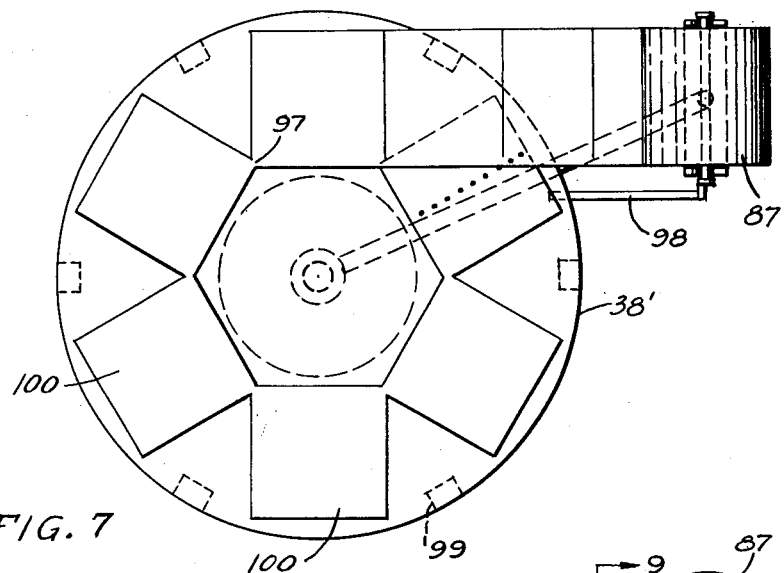
Figure 7 is an enlarged top plan view of the rotary pattie-receiving table and paper feed means associated therewith employed in a modified form of machine according to the present invention.

Referring to the drawings, the combination meat grinder and pattie forming machine is designated generally at 11 and comprises a supporting frame 12 of generally rectangular shape. Mounted on the top of said supporting frame adjacent one end thereof is a meat grinder 13 of the type having a housing 14 containing a rotatable feed worm 15, the housing being provided with the meat-receiving hopper portion 16 located adjacent the forward end of the worm 15. The worm 15 is provided with the shaft element 17 on which is secured the gear 18 which meshes with a larger gear 19 journaled on the top portion of frame 12, for example on a bracket member 20 secured on the intermediate portion of the top of frame 12. Formed integrally with the gear 19 is a smaller gear 21 which meshes with a relatively larger gear 22 mounted on a longitudinal shaft 23 journaled on the top portion of frame 12. The forward end of shaft 23 is connected by a conventional coupling 24 to the output shaft 25 of a gear reduction unit 26 mounted on the forward portion of frame 12, as shown. The gear reduction unit 26 has an input shaft 27 on which is mounted a large pulley 28 coupled by a belt 29 to the output pulley 30 mounted on the shaft of an electric motor 31. The motor 31 is suitably mounted in the lower portion of frame 12, as shown in Figure 1.

Secured on one of the rear vertical legs of frame 12 is a vertical sleeve member 32 in which is secured an angled supporting rod 33, the rod 33 being secured in vertically adjusted position by a set screw 34 provided in the sleeve member 32. The member 33 has a horizontal top portion 35 which receives the sleeve element 36 of a vertical bearing bracket 37. Designated at 38 is a circular turntable having a vertical supporting shaft 39 rotatably received in the bearing bracket 37, said shaft 39 being connected to the end of a flexible shaft 40. The other end of the shaft 40 is connected to a relatively large gear 41 suitably journaled in the top portion of frame 12, the gear 41 meshing with a smaller gear 42 secured on the shaft 23, as by being formed integrally with the gear 22. Thus, the shaft 23 simultaneously rotates the meat grinder worm 15 and the turntable 38, the speed of rotation of the turntable 38 being considerably slower than the speed of rotation of the worm 15.

Mounted in the outlet end of the meat grinder housing 14 is the conventional apertured, stationary comminuting plate 43, the rear end of the worm 15 being journaled in said meat comminuting plate, as shown in Figure 5. Designated at 44 is a rearwardly flaring outlet conduit secured to the rear end of the housing 14 adjacent the plate 43, as shown in Figure 5, whereby ground meat extruded from the apertured plate 43 passes into the outlet conduit 44. Designated at 45 is a generally circular pattie forming plate which is arranged adjacent the end of the outlet conduit 44, the plate 45 being provided with the supporting shaft 46 rigidly secured axially thereto, the shaft 46 being formed with a squared end 47 which is received in a square socket 48 provided on the end of the shaft 23. The socket 48 is cylindrical in shape and is rotatably supported in a suitable bushing 49 provided therefor on the frame 12.

Figure 8:
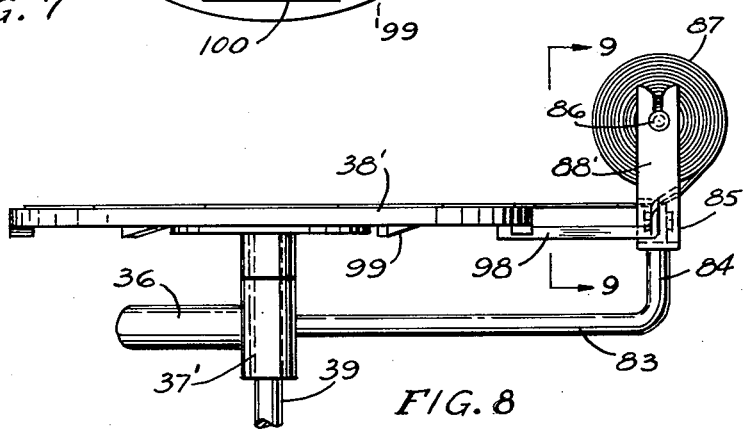
Figure 8 is an elevational view of the pattie-receiving table and paper feed means shown in Figure 7.
Figure 9:
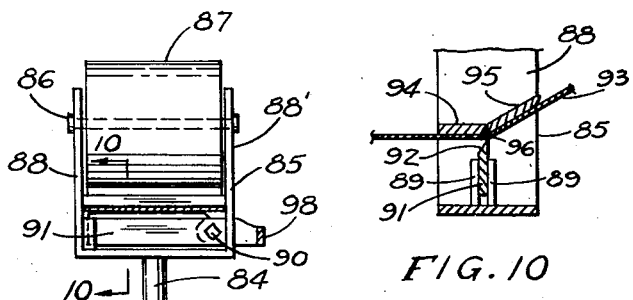
Figure 9 is a vertical cross sectional view taken on line 9—9 of Figure 8.
Figure 10:
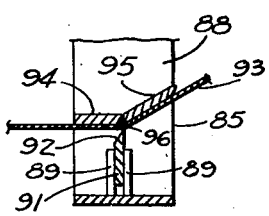
Figure 10 is an enlarged cross sectional detail view taken on line 10—10 of Figure 9.

The pattie forming plate 45 is provided with a plurality of evenly spaced pattie forming apertures 50 of any suitable shape, for example, of circular shape, as shown in Figure 8, the apertures 50 being at equal radial distances from the shaft 46 and being registrable with the outlet conduit 44 so that ground meat will be forced into the apertures 50 to form the pattie. Designated at 52 is a stationary abutment plate which is disposed adjacent the pattie forming plate 45 and which is centrally supported on the projecting end 53 of the shaft 46 extending rotatably through a central aperture in the plate 52 and threadedly engaged in the central portion of the pattie forming plate 45, as shown in Figure 5. The abutment plate 52 is held against rotation by respective retaining screws 54, 54 threadedly engaged through the downwardly diverging legs 55, 55 of a bracket 56 which is secured to and extends over the end of the outlet conduit 44, as shown in Figure 5, the ends of the screws 54 engaging in suitable recesses provided in the abutment plates 52, whereby said plate is held against the pattie forming plate 45 and is likewise held against rotation with respect to the outlet conduit 44.

The outlet conduit 44 is formed with the end plate portion 57 formed at its lower portion with the wide notch 58, the notch 58 being of sufficient size so that a pattie forming aperture 50 may be fully exposed therethrough. The abutment plate 52 is likewise formed with a similar notch 59 which is in registry with the notch 58, thereby allowing the complete exposure of a pattie forming aperture 50.

As shown in Figure 7, the outlet conduit 44 is formed centrally of its plate portion 57 with the aperture 60 through which the shaft 46 extends, the aperture 60 thus serving as a bearing for the shaft element 46.

Designated at 61 is a discharge plunger which is secured to one end of the supporting shaft 62 which is slidably mounted parallel to the shaft 23 and below said shaft 23, as shown in Figure 5, the shaft 62 being supported in a bracket 63 secured to the top portion of frame 12 below the housing 14. The plunger 61 is of substantially the same diameter as the pattie forming apertures 50 and is arranged so that it will register with a pattie forming aperture when said aperture is in its lowermost position, as shown in Figure 5. A coil spring 65 mounted on the plunger shaft 62 bears between an abutment element 66 secured on the bracket 63 and a collar 67 on the shaft 62 biasing the shaft 62 to the left, as viewed in Figure 5, namely, toward a position wherein the plunger 61 projects through a pattie forming aperture 50.

To the other end of the plunger shaft 62 is pivotally and slidably connected the free end of one of the arms 72 of a bell crank lever 69, as at 68, the lever 69 being pivotally connected at its intermediate point to a supporting plate 70 carried by the frame 12 and the bracket bar 75, as at 71. The free end of the other arm 73 of the crank lever 69 is pivotally and slidably connected to one end of a cam follower rod 78, the rod 78 being pivotally attached adjacent the other end of the supporting plate 70, as at 76. The cam follower rod 78 has the end portion 80 which engages the peripheral edge of the pattie forming plate 45, the edge of said pattie forming plate 45 being formed with the spaced cam notches 81 in which the rod end 80 is at times receivable.

The plunger member 61 is held retracted while the cam rod end 80 engages the periphery of the pattie forming plate 45, but when said end 80 enters the notch 81, the spring 65 causes the plunger element 61 to advance to the right, as shown in dotted view in Figure 3, through a pattie forming aperture 50 which is then in registry with the plunger member 61. The notches 81 are so located that when the plunger member 61 is in registry with one of the apertures 50, the rod end 80 will engage in a notch 81, allowing the plunger member 61 to be projected through the pattie forming aperture 50 adjacent thereto, causing a meat pattie carried in the aperture 50 to be ejected therefrom.

It will be understood that when the rod end 80 enters a notch 81, the bell crank lever 69 is released so that the spring 65 can act on the plunger shaft 62 to force the plunger member 61 through the pattie forming aperture 50.

In operation of the device thus far described, the meat is ground in the grinder 13 and forced through the comminuted plate 43 into the conduit outlet 44 and then forced into a pattie forming aperture 50 of the plate 45. At the same time, the shaft 22 is being rotated, so that the plate 45 rotates past the outlet conduit 44, eventually bringing the filled pattie forming aperture 50 into registry with the plunger member 61. At this time the rod end 80 enters a notch 81 in the plate 45, causing the plunger to be reciprocated and causing the pattie to be ejected onto the table 38, which rotates simultaneously with, but at a slower speed than the plate 45. Thus, a series of meat patties will be deposited on the turntable 38 as the machine operates, it being necessary only to feed a supply of meat into the hopper member 16 of the meat grinder element 13.

As shown in Figure 2, the abutment plate 52 is held substantially stationary by the screws 54, and may be further stabilized by the provision of additional bracket members 55' secured to the opposite side portions of the top of frame 12 and provided with the retaining screws 54' threaded therethrough and engaging in suitable recesses provided in the abutment plate 52.

Referring now to the modification illustrated in Figures 7 to 10, the turntable, shown at 38' is provided with the supporting shaft 39, as in the previously described form of the invention and is arranged to be rotated simultaneously with the operation of the other elements of the machine, as in the previously described form of the invention. Secured to the bearing sleeve for the shaft 39, shown at 37' is the outwardly extending bracket arm 83 having the upstanding end portion 84 on which is secured the U-shaped roll bracket 85. A roll supporting spindle 86 is mounted in the top end portions of the side arms of the bracket 85, said spindle being adapted to rotatably support a roll of paper, shown at 87 in a position wherein the paper extends substantially tangential to the turntable 38' when unrolled, as illustrated in Figure 13. Secured inside one of the upstanding arms 88 of the bracket 85 are the parallel spaced guide lugs 89, 89 and pivotally connected at 90 to the opposite bracket arm 88' is the knife blade 91 having its end portion slidably received between the guide lugs 89, 89, whereby the cutting edge 92 of the blade 91 may be moved upwardly against the paper sheet 93 from the roll 87 responsive to rotation of the knife blade 91 in a clockwise direction, as viewed in Figure 9. Secured between the arms 88 and 88' above the blade 91 are the cutting support plates 94 and 95 which are spaced to define a recess 96 between their edges in which the cutting edge 92 of the blade 91 is receivable, whereby the paper 93 may be sheared when the blade 91 is moved upwardly. The blade 91 is slightly shorter in length than the width of the paper strips 93, whereby the strip is almost but not completely severed by the action of the cutting blade 91, leaving a small connecting portion 97 between adjacent sections of the strip 93.

Rigidly secured to the cutting blade 91 and projecting beneath the peripheral portion of the turntable 38' is the cam follower arm 98 which is engageable by respective inclined cam elements 99 rigidly secured on the underside of the peripheral portion of the turntable 38' at regularly spaced intervals in accordance with the width of the desired paper section, whereby the cam arm 98 is intermittently rotated by the cam elements 99 as the turntable 38' rotates, causing the paper strips 93 to be slit in the manner shown in Figure 7 to define respective paper sections 100, each section 100 being adapted to receive a meat pattie. Thus, as a meat pattie is discharged from a pattie forming aperture 50 by the action of the plunger member 61, as above described, a paper section 100 will be disposed beneath the meat pattie, and the meat pattie will thus be deposited on the paper section 100. The turntable 38' rotates simultaneously with the rotation of the shaft 23 and with the operation of the meat grinder, as above described, and the intermittent rotation of the knife member 91 is synchronized to cut a paper section 100 of the proper width to receive a meat pattie as the pattie is discharged from the pattie forming aperture 50.

From the above it will be seen that the meat patties will be deposited sequentially on respective paper sections 100 and that the meat patties may be removed from the turntable 38' without the necessity of manually touching the patties, the patties being removed by merely detaching their associated paper sections 100, whereby the meat patties may be stacked one on top of the other, or in any other desired manner.

While a specific embodiment of an improved combination meat grinder and pattie forming machine has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In combination, a support, ground meat supply means on said support, an outlet conduit communicating with said supply means, a pattie-forming plate rotatably mounted perpendicular to and closely adjacent the end of said conduit, means continuously rotating said pattie-forming plate in a single direction, said pattie-forming plate having a plurality of evenly spaced pattie-forming apertures respectively registrable at times with the end of said conduit, a stationary abutment plate mounted outwardly of, parallel to and closely adjacent said pattie-forming plate, a discharge plunger slidably mounted parallel to the axis of said pattie-forming plate and being registerable with the pattie-forming apertures, and cooperating cam means on the peripheral edge of said pattie-forming plate and said support formed and arranged to reciprocate said discharge plunger through a pattie-forming aperture when the plunger is in registry therewith, whereby a pattie in said last-named aperture is discharged therefrom.

2. In combination, a support, ground meat supply means on said support, an outlet conduit communicating with said supply means, a pattie-forming plate rotatably mounted perpendicular to and closely adjacent to the end of said conduit, means continuously rotating said pattie-forming plate in a single direction, said pattie-forming plate having a plurality of evenly spaced pattie-forming apertures respectively registrable at times with the end of said conduit, a stationary abutment plate mounted outwardly of, parallel to and closely adjacent said pattie-forming plate, a discharge plunger slidably mounted parallel to the axis of said pattie-forming plate and being registrable with the pattie-forming apertures, cooperating cam means on the peripheral edge of said pattie-forming plate and said support formed and arranged to reciprocate said discharge plunger through a pattie-forming aperture when the plunger is in registry therewith, whereby a pattie in said last-named aperture is discharged therefrom, a pattie-receiving table rotatably mounted on said support below said pattie-forming plate, and means simultaneously rotating said table and said pattie-forming plate at relative speeds such that patties discharged from said apertures are deposited in regular sequence on said table.

3. In combination, a support, ground meat supply means on said support, an outlet conduit communicating with said supply means, a pattie-forming plate rotatably mounted perpendicular to and closely adjacent to the end of said conduit, means continuously rotating said pattie-forming plate in a single direction, said pattie-forming plate having a plurality of evenly spaced pattie-forming apertures respectively registrable at times with the end of said conduit, a stationary abutment plate mounted outwardly of, parallel to and closely adjacent said pattie-forming plate, a discharge plunger slidably mounted parallel to the axis of said pattie-forming plate and being registrable with the pattie-forming apertures, cooperating cam means on the peripheral edge of said pattie-forming plate and said support formed and arranged to reciprocate said discharge plunger through a pattie-forming aperture when the plunger is in registry therewith, whereby a pattie in said last-named aperture is discharged therefrom, a pattie-receiving table rotatably mounted on said support below said pattie-forming plate, means simultaneously rotating said table and said pattie-forming plate at relative speeds such that patties discharged from said apertures are deposited in regular sequence on said table, and a paper roll bracket secured to said support above and adjacent the peripheral portion of the surface of the table in a position to feed paper from a paper roll on said bracket onto the peripheral portion of the table.

4. In combination, a support, ground meat supply means on said support, an outlet conduit communicating with said supply means, a pattie-forming plate rotatably mounted perpendicular to and closely adjacent the end of said conduit, means continuously rotating said pattie-forming plate in a single direction, said pattie-forming plate having a plurality of evenly spaced pattie-forming apertures respectively registrable at times with the end of said conduit, a stationary abutment disc mounted outwardly of, parallel to, and closely adjacent said pattie-forming plate, said abutment disc being cut away at its lower portion sufficiently to completely expose one of said pattie-forming apertures, a discharge plunger slidably mounted parallel to and below the axis of said pattie-forming plate and being registrable with an exposed pattie-forming aperture, cooperating cam means on the peripheral edge of said pattie-forming plate and said support formed and arrange to reciprocate said discharge plunger through said exposed pattie-forming aperture when the plunger is in registry therewith, whereby a pattie in said last-named aperture is discharged therefrom, a pattie-receiving table rotatably mounted on said support below said pattie-forming plate, means simultaneously rotating said table and said pattie-forming plate at relative speeds such that patties discharged from said apertures are deposited in regular sequence on said table, and a paper roll bracket secured to said support above and adjacent the peripheral portion of the surface of the table in a position to feed paper from a paper roll on said bracket onto the peripheral portion of the table.

5. In combination, a support, ground meat supply means on said support, an outlet conduit communicating with said supply means, a pattie-forming disc rotatably mounted perpendicular to and closely adjacent the end of said conduit, means continuously rotating said pattie-forming disc in a single direction, said pattie-forming disc having a plurality of evenly spaced pattie-forming apertures respectively registrable at times with the end of said conduit, a stationary abutment disc mounted outwardly of, parallel to, and closely adjacent said pattie-forming disc, said abutment disc being cut away at its lower portion sufficiently to completely expose one of said pattie-forming apertures, a discharge plunger slidably mounted parallel to and below the axis of said pattie-forming disc and being registrable with the exposed pattie-forming aperture, cooperating cam means on the peripheral edge of said pattie-forming disc and said support formed and arranged to reciprocate said discharge plunger through said exposed pattie-forming aperture when the plunger is in registry therewith, whereby a pattie in said last-named aperture is discharged therefrom, a pattie-receiving table rotatably mounted on said support below said pattie-forming disc, means simultaneously rotating said table and said pattie-forming disc at relative speeds such that patties discharged from said apertures are deposited in regular sequence on said table, a paper roll bracket secured to said support above and adjacent the peripheral portion of the surface of the table in a position to feed paper from a paper roll on said bracket onto the peripheral portion of the table, a vertical paper cutting blade reciprocably mounted on said support below said last-named bracket in a vertical plane parallel to the axis of said bracket and located between the bracket and the peripheral portion of the table, said blade being formed and arranged to transversely cut through only a portion of the width of a strip of paper fed from the paper roll to said peripheral portion responsive to reciprocation of the blade, leaving a relatively short uncut portion adjacent the edge of the strip of paper, and cooperating cam means on the under side of the table and said blade formed and arranged to intermittently reciprocate said blade responsive to the rotation of said table.

References Cited in the file of this patent

UNITED STATES PATENTS

| | | |
|---|---|---|
| 2,176,905 | King | Oct. 24, 1939 |
| 2,185,174 | Hendler | Jan. 2, 1940 |
| 2,299,314 | Elesh et al. | Oct. 20, 1942 |
| 2,654,121 | Nelson | Oct. 6, 1953 |
| 2,757,411 | Condon | Aug. 7, 1956 |